United States Patent [19]

Reichner

[11] Patent Number: 5,082,751
[45] Date of Patent: Jan. 21, 1992

[54] INTERNAL NATURAL GAS REFORMER-DIVIDERS FOR A SOLID OXIDE FUEL CELL GENERATOR CONFIGURATION

[75] Inventor: Philip Reichner, Plum Borough, Pa.

[73] Assignee: Westinghouse Electric Corp., Pittsburgh, Pa.

[21] Appl. No.: 599,531

[22] Filed: Oct. 18, 1990

[51] Int. Cl.$^5$ .................................... H01M 8/10
[52] U.S. Cl. ................................ 429/19; 429/30; 429/34
[58] Field of Search ................ 429/19, 17, 20, 26, 429/30, 34, 38, 39, 40, 31

[56] References Cited

U.S. PATENT DOCUMENTS 4,729,931  3/1988  Grimble .................................. 429/17
4,808,491  2/1989  Reichner .............................. 429/30 X
4,876,163  10/1989  Reichner .............................. 429/30

Primary Examiner—Anthony Skapars
Attorney, Agent, or Firm—Daniel P. Cillo

[57] ABSTRACT

A fuel cell generator configuration (10) contains a plurality of axially elongated fuel cells (40) containing an outer and inner electrode with solid oxide electrolyte between the electrodes, where dividers separate portions of the fuel cells from each other, where at least one of the dividers (62) is hollow, having a closed end (63) and an entrance (64) for reformable feed fuel mixture and at least one channel (66) within the divider to allow reformable feed fuel mixture to pass to the closed end of the divider and then reverse flow and pass back, to finally pass as reformed fuel to contact the fuel cells (40), and where the divider cross-section contains a catalytic reforming material.

11 Claims, 1 Drawing Sheet

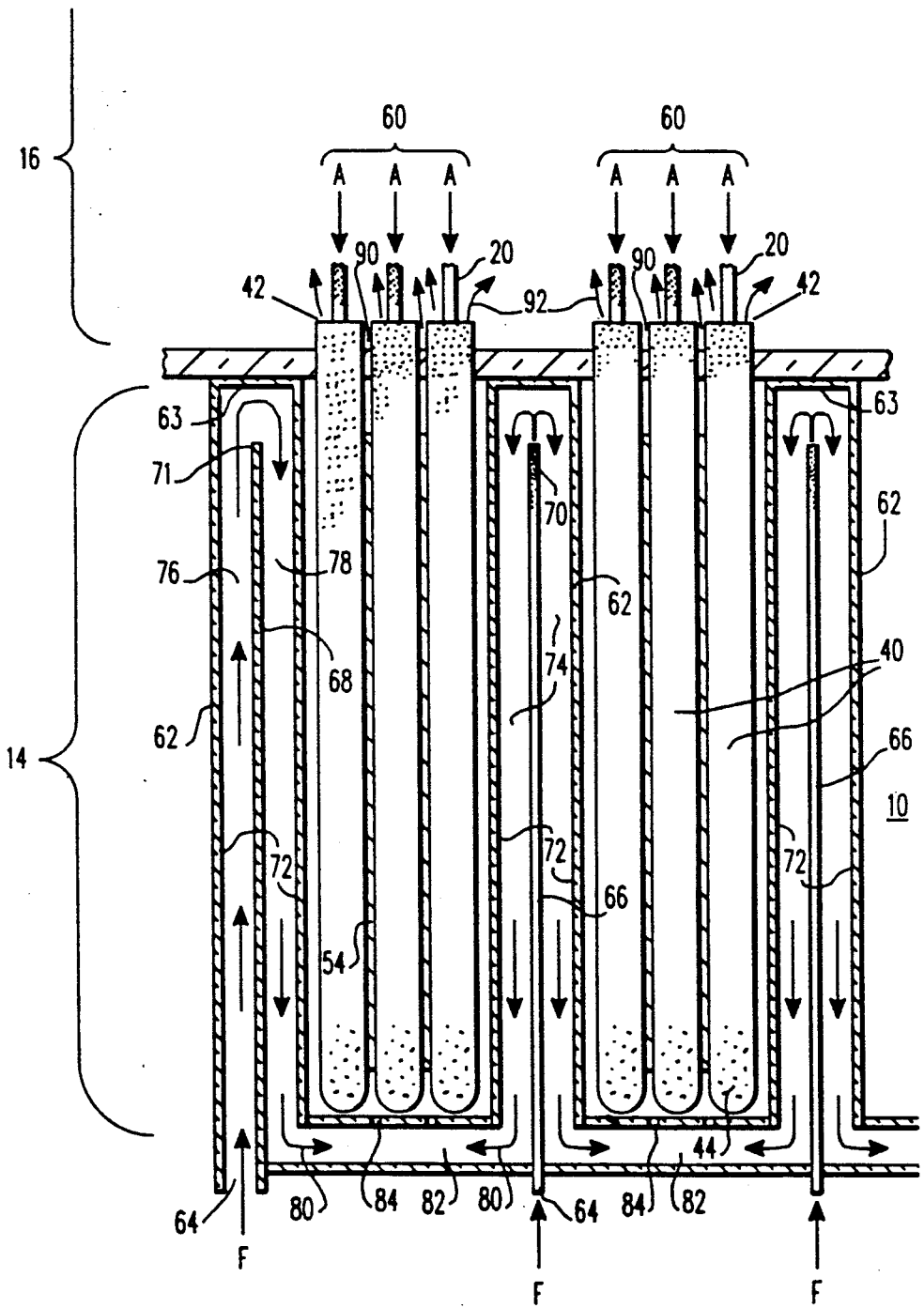

INTERNAL NATURAL GAS REFORMER-DIVIDERS FOR A SOLID OXIDE FUEL CELL GENERATOR CONFIGURATION

BACKGROUND OF THE INVENTION

This invention relates to a combination reformer for natural gas feed fuel and fuel cell stack separator, in a solid oxide fuel cell configuration.

High temperature solid oxide electrolyte fuel cell generators are well known, and taught by U.S. Pat. Nos. 4,395,468 and 4,728,584 (Isenberg). There, tubular, solid oxide electrolyte fuel cells are placed in a generator chamber defined by an alumina board housing. In larger generators, insulating divider sheets are generally used between rows of cell bundles, which bundles usually contain from 12 to 36 or more fuel cells, and may also be used between individual rows of fuel cells, as taught in U.S. Pat. Nos. 4,876,163 and 4,808,491 (both Reichner).

In these high temperature fuel cells, air and fuel are processed to produce heat and electricity. Direct use of hydrocarbon fuels, such as methane, ethane, mixtures of hydrocarbons such as natural gas ($CH_3 + C_2H_6$), or alcohols such as ethyl alcohol can form carbon on the fuel cells and other components of the generator, and can reduce the efficiency of the fuel cells by blocking gas transport and by providing electrical short-circuit paths. These hydrocarbon fuel gases are generally mixed with water vapor and reformed as an initial step, that is, converted to CO and $H_2$, through the use of a catalyst, usually platinum or nickel or compounds thereof. The reforming reaction is endothermic (requires a supply of heat) and is best performed at temperatures close to that of the solid oxide fuel cell operation (900° C. to 1,000° C.). Reforming fuel outside of the generator is undesirable, resulting in a loss of energy, as heat loss from the reformer and from connecting conduits, and making the system more expensive and complicated.

In U.S. Pat. No. 4,374,184 (Somers et al.), an attempt to solve this problem was made by in-situ reforming on a deliberately constructed inactive end of each tubular fuel cell. This however, cut down dramatically on active fuel cell area within the cell stack. In U.S. Pat. No. 4,729,931 (Grimble), catalytic packing, for reformation of hydrocarbon fuel, is placed in a catalyst chamber on the outside of the fuel cell chamber and feeding into the side of a fuel inlet plenum. A reformable gaseous fuel is fed into the open top end of the catalyst chamber and mixed with a portion of spent fuel prior to reformation, and the reformed mixture is passed directly alongside the cells. In U.S. Pat. No. 4,808,491 (Reichner), hot exhaust gas used to heat the corners of the generator is passed through an optional reformer catalyst bed directly underneath the closed ends of the fuel cells.

With the methods described previously, in practical generators, it is difficult to transfer the heat necessary for the endothermic reforming reaction without creation of excessive temperature differences within the cell stack and in the reformer. Air flow to the cells must be increased beyond that required for reaction with the fuel, to prevent excessive temperature gradients. While these methods provide useful internal reforming, a better performing internal reformer is needed. It is a main object of this invention to provide such an internal reformer.

SUMMARY OF THE INVENTION

Accordingly, the invention resides in a fuel cell generator configuration, characterized as having a plurality of electrically connected, axially elongated, fuel cells, each cell having an outer and inner electrode with solid oxide electrolyte therebetween; where elongated dividers separate and are positioned between fuel cells, and where at least one of the elongated dividers is hollow, the hollow divider having solid elongated walls, a reformable fuel mixture entrance, and an exit allowing passage of reformed fuel to the fuel cells, and where the cross-section of the divider contains a catalytic reforming material.

More specifically, the invention is further characterized in that the cells are tubular having a closed end and an open end, the hollow divider has a closed end near the open end of the fuel cells, and a reformable fuel mixture entrance near the closed end of the fuel cells, the reformable fuel mixture entrance connecting with at least one feed channel within the hollow divider and a return channel with a reformed fuel exit to the fuel cells. The term "cross-section of the divider" as used herein means the area of the divider walls and the hollow area within said walls.

Preferably, the reformed fuel will pass through a reformed fuel exit within the divider opposite the closed end of the divider and near the closed ends of the cells, and then flow to contact the outer electrode of the fuel cells; and the reformable feed fuel will pass through the center of feed tubes, acting as feed channels within the divider, to the top closed end of the divider. Catalytic reforming material is preferably on the inside or within the divider wall or in the hollow section between the feed tubes and the inside divider walls. Oxidant will pass through oxidant feed tubes inserted into the open ends of the cells and return along the inner electrode, to exit at the cell open end.

Since reformation is an endothermic reaction, reformer heat consumption can be distributed along the axial length of the fuel cells at multiple locations between fuel cell groups or bundles using the configuration of this invention. Thus, the area for heat exchange is greatly increased and the excess heat to be removed by the oxidant gas flow is significantly reduced. This configuration uses space which must already be present between the fuel cells and does not reduce the active area of the fuel cells. This invention is also adaptable to cells if non-circular cross-section and cells that are open at both ends to permit single pass flow of oxidant through the stack. Location of the fuel mixture entrance and reformed fuel exit channels, as well as orientation of flow passages within the cross-section of the divider can be selected on the basis of generator design and manufacturing requirements.

BRIEF DESCRIPTION OF THE DRAWING

In order that the invention can be more clearly understood, convenient embodiments thereof will now be described, by way of example, with reference to the accompanying drawing, which is a partially cross-sectional view of a portion of a generator having three cell bundles with hollow reformer-separators therebetween; one hollow separator having a tubular interior feed channel and another separator having a solid partition forming an interior feed channel.

DESCRIPTION OF THE PREFERRED EMBODIMENTS

Referring now to the drawing, a portion of a high temperature, electrochemical, fuel cell generator configuration 10 is shown, having a generator chamber 14 and a spent fuel combustor/oxidant preheating chamber 16. A housing, not shown, preferably of steel lined on the inside with alumina insulation board will surround all of the chambers. A plurality of tubular electrochemical fuel cells 40 are shown. The cells are electrically connected along their lengths by, for example, a porous nickel fiber material 54, and have a closed end 44 and an open end 42. Oxidant, such as air A, is fed through feed tubes 20 inserted into the open end 42 and reformed fuel, such as hydrogen and carbon monoxide, is passed over the outside of the cells 40. This arrangement is shown in more detail by U.S. Pat. No. 4,395,468, herein incorporated by reference.

The tubular fuel cells 40 contain an outer, porous fuel electrode and inner, porous air electrode with solid oxide electrolyte, such as yttria stabilized zirconia therebetween. The outer, porous fuel electrode can preferably be made of nickel/zirconia cermet and the inner porous air electrode, which may be supported on a porous ceramic tube, can preferably be made of, for example, an appropriately doped oxide of the perovskite family, such as lanthanum manganite.

A plurality of axially elongated cells, forming cell bundles 60, are separated by elongated dividers. Some of the elongated dividers can be solid pieces of porous alumina fiber cloth or board up to approximately 3 cm thick (not shown), and at least one other divider will be the combined reformer-dividers shown as 62. These dual purpose dividers 62 are hollow as shown and can have solid, elongated metal or alumina walls as shown, which can be porous or non-porous as required. A reformer-divider closed end is shown at 63.

Each of the reformer-dividers 62 has an entrance 64 for reformable feed fuel mixture F, such as natural gas, near the closed ends 44 of the cells 40, and a channel of some form within the reformer-divider. This channel, which, for example, can be in the form of tubes 66 or which can be formed by a partition 68, will allow reformable feed fuel mixture to pass inside the reformer-divider 62 to the closed end top 63 of the reformer-divider near the open end 42 of the fuel cells, and then back to exit as reformed fuel to the fuel cells, via a distribution plenum 82 near the closed end 44 of the cells.

As shown in the drawing, when tubes 66 are used, as in the central reformer-divider, the reformable fuel mixture passes from entrance 64, through the inside of the tube 66, to the top 70 of the tube where the reformable fuel mixture exits, reverses flow, and passes back down the reformer-divider. When a single partition 68 is used, the reformable fuel mixture passes from entrance 64, along one side of the partition, in the channel formed by the partition and the divider walls, to the top 71 of the partition, over the top of the partition, where the reformable fuel mixture reverses flow and passes back down the reformer-divider in the channel formed by the partition and the other divider wall.

Catalytic reforming material will be disposed within the cross-section of the divider, for example, as a coating on or within the side walls 72 of the hollow separator-divider, or as a packing within the chamber area 74 between tube 66 and the side walls of the separator-divider; or in the feed side 76 and/or return side 78 formed by partition 68, that is, on one side or both sides of partition 68. The catalytic reforming material will contain a catalyst effective to reform hydrocarbon feed fuel, and if used as a bed in portions 74, 76 or 78 it should not be packed so tightly as to excessively restrict gas flow. The reforming material will preferably contain at least one of platinum and nickel, and will most preferably contain nickel. The reforming material can be in the form of a film, a coating, metal fibers, high surface area pellets or particles by themselves or with alumina filaments, as a coating on alumina filaments, and the like, and can also contain effective amounts of additives that will help to control carbon deposition.

This reforming is a process in which the reformable fuel is combined with water and/or carbon dioxide to provide a reformable fuel mixture which when contacted with catalytic reforming material as to the hydrocarbon fuel, will produce carbon monoxide and hydrogen in a heat environment. For example, the reforming of methane and ethane (natural gas) can be as follows:

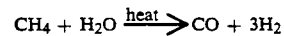

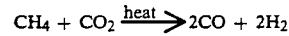

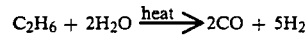

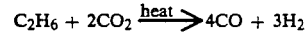

Excess water is generally provided in the fuel mixture to reduce the tendency for carbon deposition. After reformation, the reformed fuel 80 passes outside of the divider to contact the fuel cells 40, as through distribution plenum 82 and ports 84 near the bottom 44 of the fuel cells.

In a preferred example, the channels will be a series of hollow ceramic or high temperature-resistant metal (such as Inconel) tubes within hollowed out alumina partition boards, and particles of nickel acting as reforming catalyst will be contained within the chamber area between the tubes and the inside alumina partition board walls.

Reformed fuel enters the generator chamber 14 through the ports 84 near the closed end of the fuel cells and flows over the periphery of the cells. The fuel electrochemically reacts with the oxygen passing through the solid electrolyte from the air, and reaches the porous barriers 90 in depleted form. The hot, depleted fuel passes through the barrier, into the preheating chamber 16, where it reacts directly with the oxygen depleted air 92 returning from the inside of the fuel cells, as is well known. The sensible heat in the depleted fuel and air, as well as the heat of the reaction, are utilized to preheat the entering air. The products of the direct fuel-air interaction are then discharged from the preheating chamber, and the heat energy contained in the products can be advantageously utilized, for example, to preheat incoming reactants in conventional metallic heat exchangers.

I claim:

1. A fuel cell generator configuration, comprising a plurality of electrically connected, axially elongated, fuel cells, each cell having an outer and inner electrode with solid oxide electrolyte therebetween; where elongated dividers separate and are positioned between fuel cells, and where at least one of the elongated dividers is hollow, the hollow divider having solid elongated walls, a reformable fuel mixture entrance, and an exit allowing passage of reformed fuel to the fuel cells, and where the cross-section of the divider contains a catalytic reforming material.

2. The configuration of claim 1, where the cells are tubular having a closed end and an open end, the hollow divider has a closed end near the open end of the fuel cells, and a reformable fuel mixture entrance near the closed end of the fuel cells, the reformable fuel mixture entrance connecting with at least one feed channel within the hollow divider and a return channel with a reformed fuel exit to the fuel cells.

3. A fuel cell generator configuration, comprising a plurality of electrically connected, axially elongated, tubular fuel cells, each cell having a closed end and an open end and comprising an outer and inner electrode with solid oxide electrolyte therebetween; where elongated dividers separate and are positioned between fuel cells, and where at least one of the elongated dividers is hollow, the hollow divider having solid elongated walls, a closed end near the open end of the fuel cells and a reformable fuel mixture entrance near the closed end of the fuel cells, the reformable fuel mixture entrance connecting with at least one feed channel within the hollow divider and a return channel with a reformed fuel exit to the fuel cells, and where the cross-section of the divider contains a catalytic reforming material.

4. The configuration of claim 3, where the feed channel within the divider is formed by a partition.

5. The configuration of claim 3, where the feed channel within the divider is at least one hollow feed tube where reformable feed fuel can pass through its center.

6. The configuration of claim 3, where the catalytic reforming material comprises at least one of platinum and nickel.

7. The configuration of claim 3, where the hollow dividers are made from alumina.

8. The configuration of claim 3, where the catalytic reforming material is on the inside or within the hollow divider wall.

9. The configuration of claim 4, where the catalytic reforming material is on both sides of the partition.

10. The configuration of claim 4, where the catalytic reforming material is on one side of the partition.

11. The configuration of claim 5, where the catalytic reforming material is in the cross-section between the feed tubes and the inside hollow divider walls.

* * * * *